(12) United States Patent
Mckenzie et al.

(10) Patent No.: X4474
(45) Date of Patent: Jun. 19, 1826

(54) WATER WHEEL, HEAD OF WATER APPLYING

(76) Inventors: D.M. Mckenzie; M.L. Barber; S.Dean; J.McNaughton

Donald McKenzie, Martin L. Barber, Seth Dean &
John C. McNaughton - Letters Patent Dated June 19. 1826.

The Schedule referred to in these Letters Patent and making part of the same
containing a description in the words of the said Donald McKenzie Martin L. Bar-
ber Seth Dean & John C. McNaughton themselves of their improvement in the mode of
applying one head of water to any number of water wheels.

Make a horizontal water tight flume at the upper end of which
affix a perpendicular penstock. - Make the flume six or more feet wide so as to have the
flume two feet wider than the diameter of the water wheel - that is, if the wheel be four
feet in diameter, the flume must be six feet wide, - and so in that proportion if the wheel
be greater or smaller - the flume must be two and a half feet high for a flume six
feet wide or in proportion to the breadth of the flume or double the height of the thick-
-ness of the wheel, and in that proportion, and the flume must be in length accor-
-ding to the number of wheels used. that is for four wheels it must be thirty feet
long, leaving a space of three & a half feet between each wheel, and so on in that pro-
-portion for any number of wheels... This flume is equally divided by partitions for the
wheels to work in and to prevent the escape of the water except thro' the wheels; begin
at the end of the flume and run a perpendicular partition across the flume down from
the top one & one quarter foot wide, or half the height of the flume then run from
the bottom of this last partition a horizontal one six feet long which forms a squar-
[illegible] with it perpendicularly downwards to the bottom of the flume in the centre
or directly under the wheels of this horizontal partition we cut a circular opening,
the size of the inside of the wheel to let the water come up thro' on to the buckets
of the wheels: - round the edge of this opening make a curb or hoop two or three in-
ches high to fit the wheel close and to prevent the water from escaping except
thro' the buckets - Now commence with another two feet from this last described
one & make it in the same manner, and so on with any number of wheels..

The top of the covering of the flume lays upon a level
with the upper rim of the water wheels in a circular form, or fitted round the
edge of the same in order to keep the water from passing upwards, or to waste or
injure the motion of the wheels.. any wheel can be stopped at pleasure by raising

United States Patent

Patent No.: X4474 the lower perpendicular partition in the groove or slide across the flume behind the wheel you may wish to stop while the rest of the wheels are in motion. On the same principle the water can be let upon reaction wheels on the upper side. - All des-
-criptions of reacting water wheels, or water wheels that operate under water may be ap-
-plied to this principle with shafts passing thro' their centre; the lower ends resting on sockets, the upper ends to which cog wheels &c may be attached or fastened in any convenient manner. The above dimensions may be varied to suit convenience. This in-
-vention can be applied to propelling all kinds of machinery such as boats, mills &c. -
The water rushes down the perpendicular flume, turns & rushes up thro' the opening under the wheel to the buckets of the wheel, & then passes down & up thro' the next opening on to the second wheel; & so throughout all the wheels in rotation until its passage is at an end: the water being confined by the partitions is forced to pass up & down on all the wheels & thereby cause the same to revolve with great ve-
-locity & force; it then passes out at the lower end. The horizontal flume may be round with any number of reacting water wheels on a shaft passing through the centre of the flume; and any number of shafts may be geared together with wheels on them & thereby gain power; or the said flume may be made any other form by curv-
-ing the water wheels; - On the same principle an upright confined flume may be constructed with any number of reacting water wheels on the same shaft. - The principle of this invention is that the same water which would be required to turn one wheel can be applied by a confined flume & partitions to work any number of wheels & thereby gain power; - All the water wheels must be of the same size & have the same dis-
-charge of water & no discharge or waste of water but thro the buckets. -

What we claim as our invention is the application of one water power to the propelling of any number of wheels by the confined flume & the mode of constructing the horizontal confined flume; also the application of any number of the reacting water wheels to one or more shafts in a confined flume either round or square &c; - We make no claim to the reacting wheels, shafts &c.

Witnesses
[illegible] White
[illegible] Pryer

Donald McKenzie
Martin S. Barber
Seth Dean
John C. McNaughton

[illegible]
C. [illegible]

[illegible] Aug 10. 1850.

102[illegible] words

2—328 *a.*

DRAFTSMAN'S DIVISION.

*All communications should be addressed to*
"The Commissioner of Patents.
Washington, D. C."

*DEPARTMENT OF THE INTERIOR,*

United States Patent Office,

*Washington, D. C., ............, 189...*

*SIR:*

*The printed* copies *of Patent No.* D. McKenzie et al. June 19 1826 are *exhausted.*

*As soon as printed a copy will be mailed you to complete your order.*

*By direction of the Commissioner:*

*Very respectfully,*

*Chief Clerk.*

31431b6-97-5m